United States Patent [19]

Solomon

[11] Patent Number: 4,974,946
[45] Date of Patent: Dec. 4, 1990

[54] HIGH CONTRAST DISPLAY DEVICE ENCLOSURE SYSTEM USING TRANSPARENT LIGHT POLARIZING MEANS

[76] Inventor: Dennis J. Solomon, P.O. Box 289, Yarmouthport, Mass. 02675

[21] Appl. No.: 141,217

[22] Filed: Jan. 6, 1988

Related U.S. Application Data

[63] Continuation-in-part of Ser. No. 699,905, Feb. 8, 1985, abandoned.

[51] Int. Cl.⁵ .............................................. G02B 5/30
[52] U.S. Cl. .................................. 350/399; 350/276 R
[58] Field of Search ............... 350/132, 399, 400, 406, 350/407, 144, 276 R; 358/88, 89; 340/755; 353/8

[56] References Cited

U.S. PATENT DOCUMENTS

| | | | |
|---|---|---|---|
| 2,508,920 | 5/1950 | Kell | 358/89 |
| 2,519,387 | 8/1950 | Marks | 350/399 |
| 3,097,261 | 7/1963 | Schipper et al. | 340/755 |
| 3,140,415 | 7/1964 | Ketchpel | 340/755 |
| 3,174,413 | 1/1973 | Craig | 350/399 |
| 3,415,589 | 12/1968 | James | 350/399 |
| 3,621,231 | 11/1971 | Craig | 350/399 |
| 3,636,551 | 1/1972 | Maquire | 358/88 |
| 3,744,048 | 7/1973 | Treilhel | 340/755 |
| 4,007,979 | 2/1977 | Coblitz | 350/399 |
| 4,639,081 | 11/1987 | O'Brien | 340/755 |

Primary Examiner—Jon W. Henry

[57] ABSTRACT

A display device enclosure system for high contrast includes a display volume visible from all radial directions enclosed by a transparent light-polarizing material including perpendicular light-polarizing directions. The enclosure system provides a dark background for a moving screen or a plurality of illumination source placed inside the enclosure providing a display.

3 Claims, 3 Drawing Sheets

HIGH CONTRAST DISPLAY DEVICE ENCLOSURE SYSTEM USING TRANSPARENT LIGHT POLARIZING MEANS

This application is a continuation-in-part of my copending case appl. Ser. No. 06/699/905 filed Feb. 8, 1985 now abandoned.

DESCRIPTION

1. Technical Field

This invention relates to display devices and more particularly to three dimensional devices.

2. Background Art

The real-time, three-dimensional, volumetric presentation of images is desirable in education, research, engineering, medicine, entertainment and defense. Numerous inventions have been proposed which are generally too complicated, expensive or without sufficient real-time resolution to gain wide acceptance. A rotating electroluminescent screen within a sphere is described by U.S. Pat. No. 3,097,261. Other ingenious examples include U.S. Pat. Nos. 3,154,636, 3,406,312, 3,555,349, 3,636,551, 3,744,048, and 4,692,878. These patents describe three-dimensional displays using moving screens, cathode-ray tubes, and fiber optics. However, none of these inventions provide a simple construction which permits real-time, three-dimensional display or may be viewed in ambient light.

Accordingly, it is the object of this invention to provide a high-contrast, 3-dimensional image in the ambient light of an office or laboratory.

The above and still further objects, features and advantages of the present invention will become apparent upon consideration of the following detailed disclosure of specific embodiments of the invention, especially when taken in conjunction with the accompanying drawings, wherein.

DETAILED DESCRIPTION OF THE INVENTION

Three-dimensional, volumetric displays generally create the impression of a real space object by projecting a series of planar images from a cyclically-displaced, real or virtual screen. One illustrative example is the display plane 300a . . . n of FIG. 1 in U.S. Pat. No. 3,555,349. Another illustrative example is the electroluminescent panel 10 of FIG. 1 in U.S. Pat. No. 3,097,261. Other examples are found in the U.S. Patents previously cited as background art.

Figure 1:
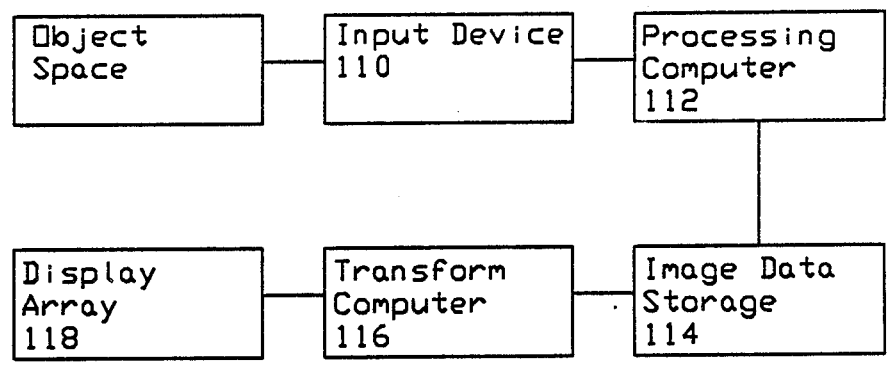
FIG. 1 shows a block diagram of volumetric display devices.

A restatement of the general principles of volumetric displays is presented in FIG. 1 of this application. Object space is described by an input device 110, which may be CAT-scans, radar, sonar, or computer graphics programs commonly known. The input is processed by a computer 112, stored in a storage means 114 and is transformed in the display array through 116 and 118. By analogy to U.S. Pat. No. 3,097,261, the input device would be the manual insert 22 or 23, The display computer would generally be the x,y-channel 19, 16 and the display array 118 would correspond to the electroluminescent panel 10.

Figure 2:
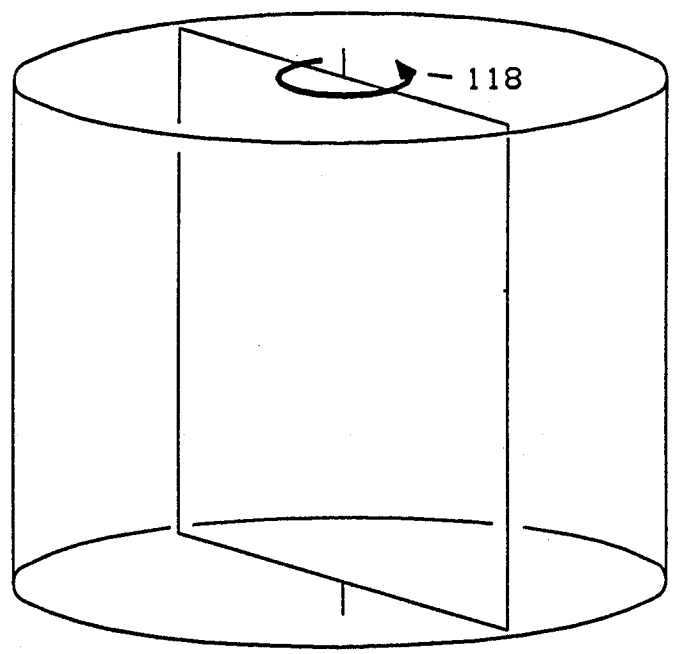
FIG. 2 shows a perspective view of a 3-d display device incorporating the present invention.

Another presentation of the common elements is illustrated in FIG. 2 of this application. In addition to other common elements described in FIG. 1, the drawing shows a cylinder with an enclosed array 118 similar to the plastic ball 11 and electroluminescent panel 10 of U.S. Pat. No. 3,097,261.

The aforementioned features and characteristics of three-dimensional displays are known and not novel. Common to such inventions is a projection screen or panel means which is generally planar and an enclosure of the space described by the moving or stationary screens.

A problem common to these displays is the reduction of visual contrast of the displayed image when viewed in an normally-lit environment such as an home, office or laboratory. Due to the transparency of the three-dimensional volumetric display when the screen is not orthogonal to the observer, the human eye will integrate the moving image with the background or ambient light.

One solution to this problem would be to place a black backdrop on the side of the display opposite the observer. However, this solution would not permit observers on the opposite side of the display to simultaneously view the image.

The solution to this problem, described in the present application is a novel and unobvious relationship between the display screen, enclosure and polarization axis which permits a full and continuous 360 degrees observation of the display while virtually eliminating background or ambient light. This invention has utility for volumetric imaging displays of a type which employ real or virtual screens or are generally transparent to the observer during a period of the image cycle.

Figure 3:
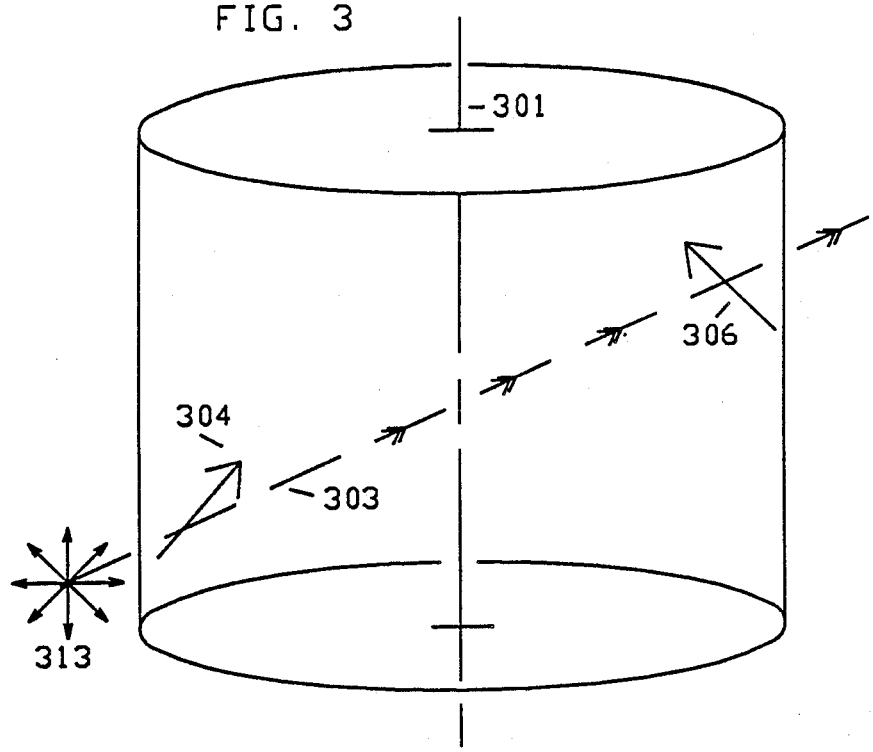
FIG. 3 shows a perspective view of a polarized display enclosure.

Referring to FIG. 3, about a central axis 301 is the display system enclosure 302 which is constructed from light polarizing materials which permit the interior image to be observed from a location outside the enclosure. A ray of external, ambient light 303 which normally diminish the internal image to an observer 307 situated at an opposing radial position. In the present invention, the external light ray 303 which originally may be polarized in any direction 313 is plane-polarized in a direction 304 at 45 degrees to the central axis 301 by the first interaction with the polarizing enclosure means 302. The ray transverses the enclosure and upon interaction with the second surface, proximal to the observer 307, is extincted by the polarizing enclosure means 302 which has a direction of plane-polarization 306 perpendicular to that of first enclosure means 302 polarizing direction 304. Both polarizing directions 304 and 306 are at a 45 degree angle to the central axis 301 and may be from a single surface.

The aforementioned principle may be applied to spherical enclosure by maintaining a 45 degree plane of polarization to the meridians.

I claim:

1. A display device enclosure system for high contrast comprising:
   (a) a display volume visible from substantially all radial directions and enclosed by a transparent light-polarizing means, and
   (b) an axis of polarization of said polarizing enclosure means at a first proximal intersection of a chord traversing said volume and said polarizing enclosure means substantially perpendicular to the axis of polarization of said polarizing enclosure means at a second distal intersection of said chord and said polarizing enclosure means.

2. A display device enclosure system for high contrast comprising:
(a) a display volume visible from substantially all radial directions and enclosed by a transparent light-polarizing means, and
(b) an axis of polarization of said polarizing enclosure means at a first proximal intersection of a chord traversing said volume and said polarizing enclosure means is substantially perpendicular to the axis of polarization of said polarizing enclosure means at a second distal intersection of said chord and said polarizing enclosure means, and
(c) a moving screen enclosed by said enclosure system.

3. A display device enclosure system for high contrast comprising:
(a) a display volume visible from substantially all radial directions and enclosed by a transparent light-polarizing means, and
(b) an axis of polarization of said polarizing enclosure means at a first proximal intersection of a chord traversing said volume and said polarizing enclosure means is substantially perpendicular to the axis of polarization of said polarizing enclosure means at a second distal intersection of said chord and said polarizing enclosure means, and
(c) a plurality of apparent sources of illumination enclosed by said enclosure system.

* * * * *